United States Patent
Hawley

(10) Patent No.: US 7,554,785 B2
(45) Date of Patent: Jun. 30, 2009

(54) LIGHTNING DAMAGE PROTECTION FOR COMPOSITE AIRCRAFT

(75) Inventor: Arthur V Hawley, Huntington Beach, CA (US)

(73) Assignee: The Boeing Company, Chicago, IL (US)

(*) Notice: Subject to any disclaimer, the term of this patent is extended or adjusted under 35 U.S.C. 154(b) by 225 days.

(21) Appl. No.: 10/806,801

(22) Filed: Mar. 23, 2004

(65) Prior Publication Data

US 2005/0213278 A1 Sep. 29, 2005

(51) Int. Cl.
*H05F 3/00* (2006.01)
*H02H 7/20* (2006.01)
*H02H 9/06* (2006.01)
*H02H 3/22* (2006.01)
*H02H 1/04* (2006.01)
*H02H 1/00* (2006.01)

(52) U.S. Cl. .................. 361/218; 361/112; 361/117; 361/212

(58) Field of Classification Search .............. 361/216, 361/217, 218, 220, 117, 212, 112; 244/1
See application file for complete search history.

(56) References Cited

U.S. PATENT DOCUMENTS

| | | | | |
|---|---|---|---|---|
| 2,982,494 A | * | 5/1961 | Amason | 244/1 A |
| 3,755,713 A | | 8/1973 | Paszkowksi | |
| 3,906,308 A | * | 9/1975 | Amason et al. | 361/218 |
| 4,502,092 A | | 2/1985 | Bannink | |
| 4,574,325 A | | 3/1986 | Holton | |
| 4,609,904 A | * | 9/1986 | Paine | 307/10.1 |
| 4,839,771 A | * | 6/1989 | Covey | 361/218 |
| 4,888,451 A | * | 12/1989 | Toni et al. | 174/94 R |
| 4,920,449 A | | 4/1990 | Covey | |
| 5,127,601 A | | 7/1992 | Schroeder | |
| 5,225,265 A | * | 7/1993 | Prandy et al. | 428/138 |
| 5,352,565 A | | 10/1994 | Schroeder | |
| 5,698,316 A | | 12/1997 | Kuras | |
| 5,863,667 A | * | 1/1999 | Poggi | 428/608 |
| 6,327,132 B1 | * | 12/2001 | Andrivet et al. | 361/218 |
| 6,666,406 B2 | * | 12/2003 | Sankrithi et al. | 244/36 |
| 2005/0178912 A1 | * | 8/2005 | Whelan et al. | 244/120 |

* cited by examiner

*Primary Examiner*—Fritz M. Fleming
*Assistant Examiner*—Lucy Thomas
(74) *Attorney, Agent, or Firm*—Klein, O'Neill & Singh, LLP

(57) ABSTRACT

A system for protecting a composite-body aircraft from damage caused by lightning strikes includes a Faraday cage defined on the exterior surface of the aircraft body by a continuous, electrically conductive grid that extends to the outermost lateral periphery of the body. In one possible embodiment in which the aircraft's body includes a plurality of composite panels that are joined at their adjacent edges by splice plates, the conductive grid may advantageously be formed by electrically conductive splice plates, e.g., of titanium, that have their respective, adjacent ends electrically connected to each other, e.g., with conductive straps and fasteners. The conductive grid provides preferential attachment points and conductive paths for lightning strikes on the surface of the aircraft, thereby shielding the interior of the grid from lightning damage. The conductive grid can optionally function as a ground return path for the aircraft's electrical system.

19 Claims, 2 Drawing Sheets

LIGHTNING DAMAGE PROTECTION FOR COMPOSITE AIRCRAFT

BACKGROUND OF THE INVENTION

1. Field of the Invention

The present embodiments relate to lightning protection systems in general, and in particular, to a system for protecting composite-body aircraft from damage caused by lightning strikes.

2. Related Art

It is well accepted that composite (typically, carbon- or graphite-fiber-and-epoxy-resin matrices) structural components currently being incorporated into the bodies of advanced types of aircraft will be subjected to naturally occurring lightning discharges, or "strikes," during flight. In a typical lightning strike incident, the lightning strikes, or "attaches," at one extremity of an aircraft, and departs, or "detaches," from another, resulting in a very large, momentary flow of electrical current through the body of the aircraft between the two points.

The more severe, or "primary," strikes tend to attach to and detach from the body of the aircraft at features that are located at or near protuberances at the extremities of the body (e.g., the nose, tips and leading edges of wings, stabilizers, vertical fins and rudders, engine intake cowlings and diverters, and the trailing edges of rudders, elevators, and ailerons), and are characterized by a fast-rising, high-peak current ($2\times10^5$ amp) and a large energy transfer density ($2\times10^6$ amp$^2$ sec) having frequency components of from between about 1 kHz to 1 MHz. These strikes can cause severe structural damage to unprotected composite structures and their contents, as compared to conventional aluminum aircraft structures, because the energy of the strike cannot be efficiently conducted through the composite material without damage, due to its relatively lower thermal and electrical conductivities.

Additionally, other "secondary" parts of the structure, located between the typical primary attachment and detachment points, can be subjected either to primary, or to lesser discharges, referred to as "swept-stroke" lightning strikes. The latter are characterized by a fast-rising current having the same frequency spectrum, but with $1\times10^5$ amp peaks and energy transfer densities of $0.25\times10^6$ amp$^2$ sec, and can also result in severe structural damage to unprotected composite structures. The probability of experiencing either type of strike at a secondary part of the aircraft appears to be increased for aircraft that have smoothly changing shapes, such as the family of so-called "Blended-Wing-Body" ("BWB") aircraft currently under development or in production, including the B-1 and B-2 "stealth" bombers and the F-117 stealth fighter. These aircraft are characterized by smooth, blended shapes that make extensive use of composite body structures and other stealth measures to defeat their detection by radar and the like.

To prevent or minimize damage to a composite aircraft resulting from either type of strike, it is necessary to connect the attachment and detachment points of the strike with a continuous, highly conductive path that is capable of carrying a momentary, high-density electrical current without damage, such that the electrical current of the strike is substantially diverted through the conductive path, rather than through other portions of the aircraft that cannot tolerate such a current flow without damage.

Prior systems to effect lighting protection for composite aircraft structures have centered around the provision of metal coated or plated fibers in the plies of the composite structure, as described in U.S. Pat. No. 4,502,902 to Bannik, Jr. et al., or by applying a knitted wire covering over the body of the aircraft, as described in U.S. Pat. No. 3,755,713 to Paszkowksi, or by bonding a thin, metallic foil to the surface of the aircraft, as described in U.S. Pat. Nos. 5,127,601 and 5,352,565 to Schroeder. While these systems do provide some measure of protection against damage occasioned by lightning strikes, they do so at the cost of increased complexity and expense, increased weight, and/or a reduced structural integrity of the composite material. For example, a lighting protection system that relies on metal-plated graphite fibers both substantially increases the weight, and decreases the strength of the resulting composite structure.

What is needed then, is a simple, light weight, low-cost approach for the protection of a composite-body aircraft against direct lightning strikes that may occur at any location on the aircraft surface.

BRIEF SUMMARY OF THE INVENTION

In accordance with the present embodiments, a system is provided for protecting a composite-body aircraft against damage caused by lightning strikes that is lighter in weight, simpler, and less expensive to implement than conventional aircraft lightning protection systems.

In one advantageous embodiment thereof, the system comprises a "Faraday cage" defined on an exterior surface of the aircraft. The Faraday cage comprises a continuous, electrically conductive grid formed on the exterior surface of the aircraft body that extends to its outermost lateral periphery. The conductive grid provides multiple "secondary" points on the surface of the aircraft body, in addition to the "primary" points at the extremities thereof, for lightning strikes to attach to and detach from the body, as well as conductive paths on the surface of the body through which the electrical current of the lightning strike can flow without causing damage, rather than through the more vulnerable interior of the aircraft, thereby shielding the interior of the grid and its contents from lightning damage.

Advantageously, in those types aircraft in which the aircraft body comprises a plurality of composite panels, such as panels of woven graphite and/or fiberglass plies embedded in a resin matrix, that are joined to each other at their respective, adjacent edges by "splice plates," the conductive grid can be constructed by providing splice plates that are made of an electrically conductive metal, e.g., titanium, and by electrically coupling the respective adjacent ends of the individual plates to each other to form the continuous elements of the grid that spans the length and width of the exterior surface of the aircraft. The respective adjacent ends of the conductive splice plates may be electrically coupled to each other, for example, by electrically conductive fasteners that extend first through respective ones of the adjacent ends of the plates, and then through a conductive strap that extends between the respective adjacent ends of the plates.

The protection afforded by the system is particularly well adapted for use in, but is not limited to, blended-wing-body ("BWB") aircraft, because of its provision of multiple secondary lightning attachment points across the breadth of the aircraft body, and as an additional advantage, the system can be used as a ground return path of the aircraft's electrical system.

A better understanding of the above and many other features and advantages of the lightning protection system of the present embodiments may be obtained from a consideration of the detailed description thereof below, particularly if such consideration is made in conjunction with the several views of the appended drawings.

DETAILED DESCRIPTION OF THE INVENTION

Figure 1:
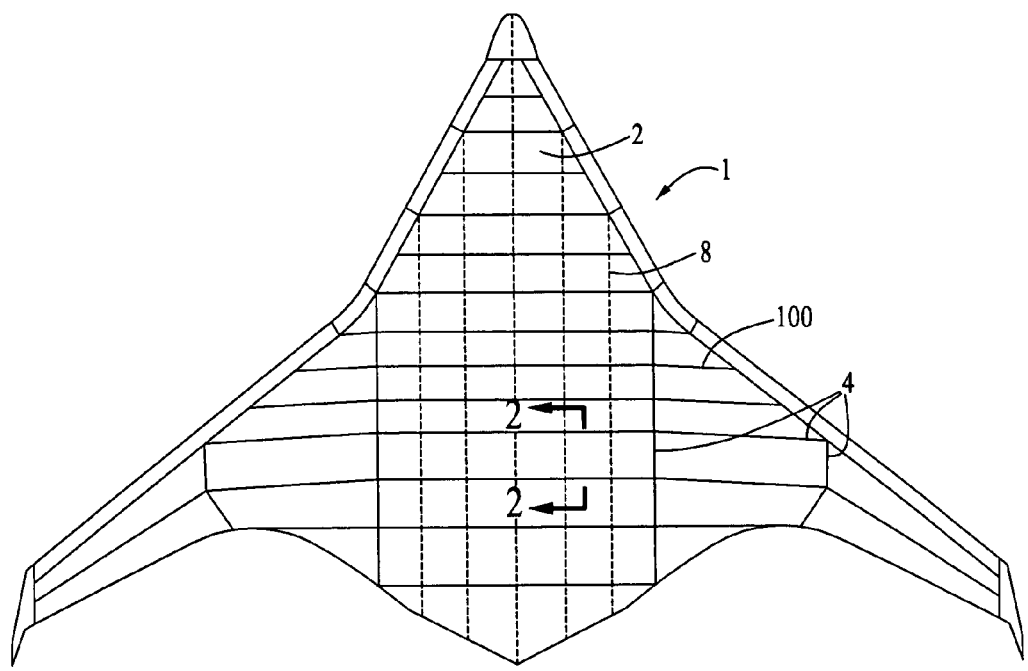
FIG. 1 is a top plan iew of a blended-wing-body ("BWB") aircraft incorporating one embodiment of the present lightning damage protection system.

FIG. 1 is a top plan view of a composite, BWB-type of aircraft 1 incorporating one embodiment of the present lightning damage protection system 100. Although the system of the present embodiments is shown in conjunction with a BWB type of aircraft, it should be understood that the system is not limited to such aircraft types, but may be advantageously employed with conventional composite-bodied aircraft, as well.

Figure 2:
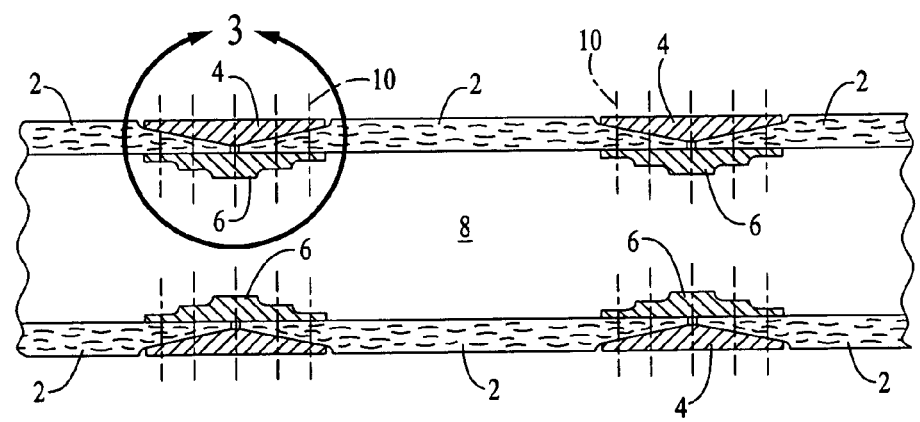
FIG. 2 is a partial cross-sectional view taken along the lines 2-2 in FIG. 1, showing structural details of the BWB.
Figure 3:
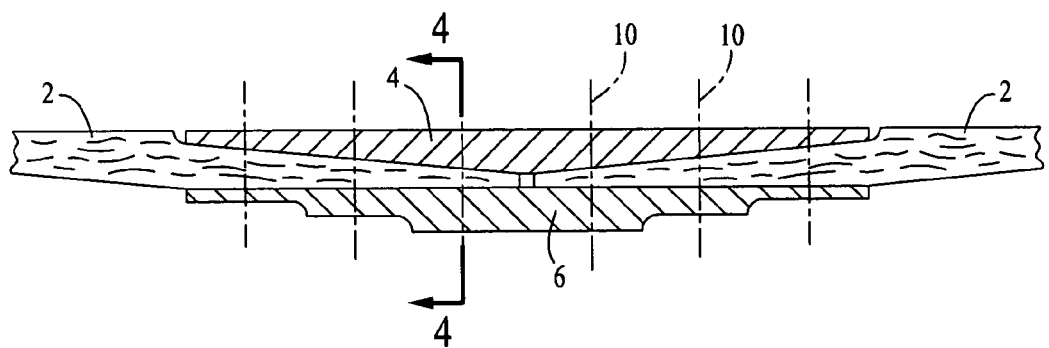
FIG. 3 is an enlarged detail view of the partial cross-sectional view of the BWB, as encircled within the line 3-3 in FIG. 2, showing splice plates of the BWB structure; and, FIG. 4 is an enlarged partial cross-sectional view of the splice plates of the BWB taken along the lines 4-4 in FIG. 3, showing an electrically conductive coupling plate thereof.

As illustrated in FIG. 1, the structure of the aircraft 1 may be seen to comprise a plurality of polygonal composite panels 2, i.e., structural skin panels made of plies of a fibrous material, e.g., "carbon" or graphite fibers, which are embedded in an epoxy resin to form a strong, rigid, light weight matrix. The panels are typically made, or "laid up," separately, and then joined to each other at their respective edges by exterior and interior splice plates 4 and 6, respectively, as illustrated in the partial cross-sectional views of FIGS. 2 and 3. The aircraft structure may also include conventional ribs 8 (shown by dotted lines in FIG. 1) and lateral stringers, or spars (not illustrated). The lower surface of the aircraft (not illustrated) is similar in appearance and construction to the upper surface, but may contain more openings or cut-outs for doors, wheel wells, engine mounts or openings, and the like.

As illustrated in FIG. 1, the lightning damage protection system 100, in essence, comprises a "Faraday cage" (illustrated by the solid lines) defined on the exterior surface of the aircraft body by a continuous, electrically conductive "grid" disposed on the exterior surface of the aircraft body and extending to its outermost lateral periphery. In theory, a "perfect" Faraday cage is an enclosure made of a perfectly conductive material with no openings or apertures into its interior. In a perfect Faraday cage, no electric fields are produced in the cage by the incidence of external electric fields on the cage, such as those accompanying a lightning strike on the cage.

However, as may be seen in the embodiment illustrated in the figure, the protective cage or grid 100 includes "openings" defined by the dielectric or quasi-dielectric composite panels 2, thereby constituting a so-called "elemental" Faraday cage. An elemental Faraday cage is a continuous enclosure of spaced, conductive grid elements that admits, or passes, higher-frequency electrical fields incident upon the cage, e.g., frequencies in the FM and higher bands, but which effectively attenuates lower-frequency electrical fields incident upon the cage, i.e., in the range of from about 1.0 kHz to 1 MHz, the frequency spectrum of lightning. The electromagnetic attenuation of the cage, in decibels ("dB") can be computed from the following relationship:

$$\text{Attenuation} = 10\log_{10}\left[\frac{c}{Kf}\right]^2,$$

$$\text{where } K = 2s\ln\left[\frac{0.83}{1-e^{-d/s}}\right]$$

a. f=frequency, Hz
b. c=speed of light ($3\times10^8$ m/sec)
c. d=grid element circumference
d. s=average grid element center-to-center spacing.

As will be evident to those of skill in this art, the lightning protection grid 100 of the aircraft 1 illustrated can be advantageously created by providing electrically conductive exterior splice plates 4 at the adjacent margins of the composite panels 2, and by electrically coupling, or "bonding," the respective adjacent ends of the plates to each other to form the continuous, electrically conductive elements of the grid. While the exterior splice plates can be made of any suitable, electrically conductive material, titanium (or alloys thereof) is a preferred material, because of its intrinsic strength-to-weight ratio, and because of its thermal-expansion and corrosion compatibilities with the composite panels. The interior splice plates 6 can also, but need not necessarily, be made of a metal. However, the use of metal splice plates also provides other advantages in the fabrication of the joints between the panels when compared to splice plates made of composite materials. The ductility of the metal reduces the stress concentrations at loaded bolt holes and permits the joint to "work" more effectively. The higher strength of the metal permits a thinner exterior splice plate 4 to be used, and thereby reduces the shift of the neutral axis across the joint. Additionally, the higher bearing capability of the metal reduces the problem of counter-sinking in thin plates.

Figure 4:
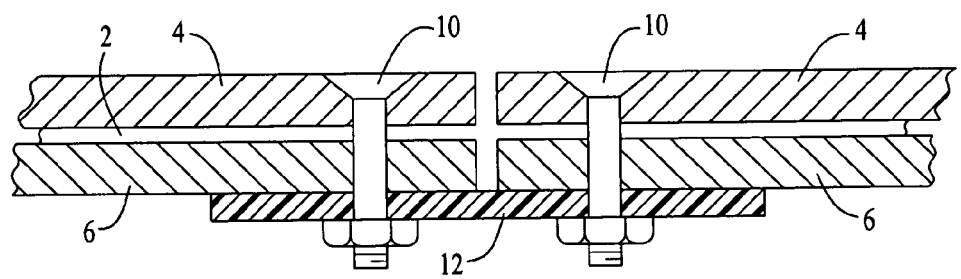

FIG. 4 illustrates and example embodiment of a method whereby the respective adjacent ends of the exterior splice plates 4 can be electrically bonded to each other to form the continuous, conductive elements of the grid 100. In the particular embodiment illustrated therein, the respective adjacent ends of the electrically conductive splice plates 4 are electrically coupled to each other by conductive fasteners 10, e.g., titanium bolts or rivets (represented by phantom centerlines thereof in FIGS. 2 and 3), that extend through respective ones of the adjacent ends of the plates and through an electrically conductive bonding strap 12 that extends between the respective adjacent ends of the plates, as shown. The bonding strap may be made of any material that is a relatively good electrical conductor, including titanium and copper. Additionally, other methods of forming the conductive bond between adjacent splice plates may be used, such as those described in, e.g., U.S. Pat. Nos. 5,698,316 to Kuras et al. and U.S. Pat. No. 4,574,325 to Holton.

Those of skill in this art will also appreciate an additional advantage of the present conductive grid 100. As is known, any vehicle that incorporates an electrical system and moves relative to the ground, or earth, and which therefore cannot effect a direct connection to ground, must also incorporate a ground return path for the electrical system. If desired, the conductive grid of the present invention can serve as such a ground return path for the aircraft's electrical system, either as a replacement therefor, or as a redundant, "backup" ground path.

Because it provides many "secondary" attachment and detachment points for lightning strikes, the present conductive cage 100 is particularly advantageous for use in composite BWB aircraft, because of the relative dearth of protuberances at the extremities of the bodies thereof, but it should be understood that it can also be incorporated advantageously into any aircraft containing structural surfaces of composite materials.

As will by now be evident to persons of skill in this art, many modifications, substitutions and variations can be made in and to the materials, configurations and methods of implementation of the present reliable, low-cost lightning damage protection system 100 without departing from its spirit and scope. Accordingly, the scope of the present system should not be limited to the particular embodiments illustrated and described herein, as the are merely examples, but rather, should be fully commensurate with that of the claims appended hereafter and their functional equivalents.

What is claimed is:

1. Apparatus for protecting a composite-body aircraft against damage from lightning strikes, comprising:
    an aircraft body including a plurality of composite panels;
    a first plurality of electrically conductive splice plates extending along junctions between adjacent ones of the composite panels at respective edges of the adjacent composite panels, the first plurality of electrically conductive splice plates abutting exterior surfaces of the composite panels;
    a second plurality of electrically conductive splice plates extending along the junctions between adjacent ones of the composite panels at respective edges of the adjacent composite panels, the second plurality of electrically conductive splice plates abutting interior surfaces of the composite panels;
    a plurality of electrically conductive straps; and
    a plurality of electrically conductive fasteners;
    wherein the straps and the fasteners mechanically and electrically couple adjacent ends of the splice plates to one another such that the splice plates form a continuous, electrically conductive grid about the aircraft body.

2. The apparatus of claim 1, wherein the continuous, electrically conductive grid extends to the outermost lateral periphery of the aircraft body.

3. The apparatus of claim 1, wherein the first plurality of electrically conductive splice plates comprise titanium.

4. The apparatus of claim 1, wherein the aircraft body comprises a blended-wing-body ("BWB") aircraft.

5. The apparatus of claim 1, wherein the plurality of composite panels comprise graphite fibers.

6. The apparatus of claim 1, wherein the aircraft body includes an electrical system, and wherein the electrically conductive grid comprises a ground return path of the electrical system.

7. A method for protecting a composite-body aircraft against damage from lightning strikes, comprising:
    coupling adjacent composite panels on an aircraft body to one another at respective edges of the adjacent composite panels using electrically conductive splice plates, electrically conductive straps and electrically conductive fasteners;
    wherein the straps and the fasteners mechanically and electrically couple adjacent ends of the splice plates to one another such that the splice plates form a continuous, electrically conductive grid about the aircraft body; and
    further wherein a first plurality of the electrically conductive splice plates extend along junctions between the adjacent composite panels and abut exterior surfaces of the composite panels, and a second plurality of the electrically conductive splice plates extend along the junctions between the adjacent composite panels and abut interior surfaces of the composite panels.

8. The method of claim 7, wherein the continuous, electrically conductive grid extends to the outermost lateral periphery of the aircraft body.

9. The method of claim 7, wherein the first plurality of the electrically conductive splice plates comprise titanium.

10. The method of claim 7, wherein the aircraft body comprises a blended-wing-body ("BWB") aircraft.

11. The method of claim 7, wherein the composite panel comprise graphite fibers.

12. The method of claim 7, wherein the aircraft body includes an electrical system, and wherein the electrically conductive grid comprises a ground return path of the electrical system.

13. An aircraft body comprising:
    a plurality of composite panels, adjacent pairs of the composite panels defining a V-shaped groove therebetween; and
    a plurality of electrically conductive splice plates disposed within the grooves such that an exterior surface of each splice plate is flush with exterior surfaces of the adjacent pair of composite panels;
    wherein adjacent ends of the splice plates are mechanically and electrically coupled to one another such that the splice plates form a continuous, electrically conductive grid about the aircraft body.

14. The aircraft body of claim 13, further comprising plurality of electrically conductive straps and a plurality of electrically conductive fasteners, wherein the straps and the fasteners in mechanically and electrically couple the adjacent ends of the splice plat is to one another.

15. The aircraft body of claim 13, wherein the electrically conductive splice plates comprise titanium.

16. The aircraft body of claim 13, wherein the aircraft body comprises a blended-wing-body ("BWB") aircraft.

17. The aircraft body of claim 13, wherein the continuous, electrically conductive grid extends to the outermost lateral periphery of the exterior surface of the aircraft body.

18. The aircraft body of claim 13, wherein the composite panels comprise graphite fibers.

19. The aircraft body of claim 13, wherein the aircraft body includes an electrical system, and the electrically conductive grid comprises a ground return path of the electrical system.

* * * * *